United States Patent Office 3,436,560
Patented Apr. 1, 1969

3,436,560
VOLTAGE LEVEL DETECTOR WITH TUNNEL DIODE
Jean Claude Marchais, Paris, France, assignor to CSF—Compagnie Generale de Telegraphie Sans Fil, a corporation of France
Filed Dec. 6, 1965, Ser. No. 511,852
Claims priority, application France, Dec. 7, 1964, 997,647
Int. Cl. H03k *19/10*
U.S. Cl. 307—322      2 Claims

ABSTRACT OF THE DISCLOSURE

A tunnel diode is continuously coupled to the signal input through a feedback loop; thus the voltage across the diode terminals follows the input voltage and the voltage jump across the diode terminals detects a fixed predetermined value of the input voltage, whatever the temperature.

---

The present invention relates to tunnel diode detectors for detecting a predetermined voltage level.

It is known to use a tunnel diode in series with a resistor as voltage level detector. The detected voltage threshold is then that voltage for which the current in the circuit is equal to the peak current of the diode, and varies therefore with the temperature.

It is an object of the invention to provide a voltage level detector free of this drawback.

According to the invention there is provided a voltage level detector comprising: a signal input, a tunnel diode, a negative voltage feedback loop coupling said diode to said input, and means for collecting an output signal at the terminals of said diode.

For a better understanding of the present invention and to show how the same may be carried into effect, reference will be made to the drawings accompanying the following invention and in which.

Figure 1:
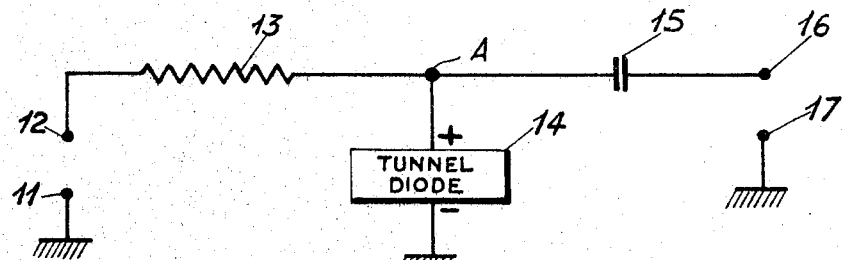
FIG. 1 is a diagram of a conventional tunnel diode voltage detector.

The known voltage level detector of FIG. 1 comprises a resistor 13 with a value $r$ and a tunnel diode 14 in series with the terminals 11 and 12 to which is applied the variable input voltage E, the passage of which through a reference voltage value $E_0$ is to be detected.

The output signal appears between the output terminals 16 and 17 which are connected to the terminals of the diode 14 through a circuit, the nature of which may depend on the manner in which the assembly is used, for example through a capacitance 15 connected between the + terminal of the diode and the terminal 16.

Figure 2:
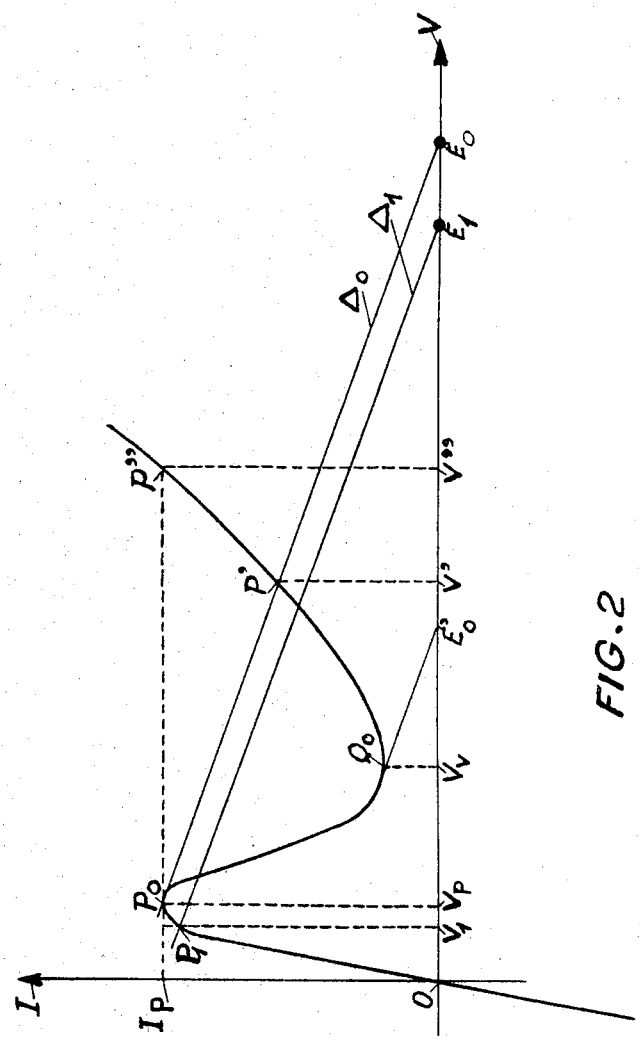
FIG. 2 shows the voltage-current curve of a tunnel diode.

The operation of the arrangement can be understood from the diagram of FIG. 2 showing the characteristic of the tunnel diode. The voltages are plotted along the horizontal axis and the currents along the vertical axis. The straight lines $\Delta_1$ and $\Delta_0$ respectively represent the positions of the load line corresponding to the resistor 13 of FIG. 1 for input voltages $E_1$ and $E_0$, $E_0$ being the level to be detected and $E_1$ slightly lower than $E_0$.

When the voltage $E_1$ applied between the terminals 11 and 12 arises whilst remaining below $E_0$, the operating point of the diode shifts along the branch of the curve between points O and $P_0$. For the value $E=E_1$, for example, the operating point is at $P_1$ at the intersection of the characteristic with the straight line with a slope $1/r$ passing through the point $I=0$, $V=E_1$.

The voltage at the terminals of the diode is then $V_1$ and that at the terminals of the resistor 13 is equal to $E_1-V_1$ represented by the segment $V_1E_1$ of the voltage axis.

When E reaches $E_0$, the operating point jumps from $P_0$ to $P'$. At the diode terminals occurs a voltage jump equal to $V'-V_p$, which detects the passage of E through $E_0$, $V'$ and $V_p$ being the respective abscissae of the points $P'$ and $P_0$. It can be seen on the diagram that the jump is determined by the intersection of the straight load line with the peak of the curve. However, as is well known this curve is distorted with the temperature and, in practice, the point $P_0$ is displaced along a line parallel to the vertical axis and whose abscissa is $V_p$. As a consequence, the value $E_0$ of the voltage E at which the jump occurs varies with temperature.

On the other hand, the value of the detecting signal which is $V'-V_p$ varies with the resistance $r$. Further, for a voltage E which decreases from an original value higher than $E_0$, the passage through the value $E_0$ will not be detected. An output pulse occurs only for $E_0'$ when the straight load line passes through the valley $Q_0$ of the curve.

Also, in the known system of FIG. 1, the sensitivity is substantially a function of the angle of intersection between the load line and the characteristic for $E=E_0$, and varies with the resistance $r$.

Figure 3:
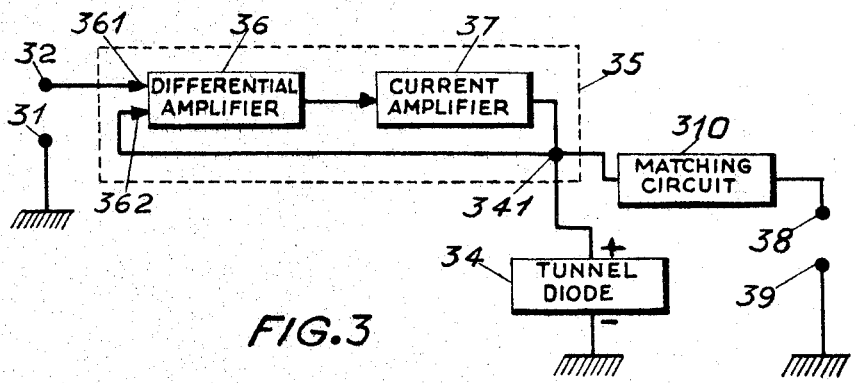
FIG. 3 is a basic diagram of the voltage level detector according to the invention.

The detector according to the invention which is shown in FIG. 3, avoids these drawbacks. It comprises, between the input terminals 31, 32 and a tunnel diode 34, a negative feedback loop 35 comprising in series a differential amplifier 36 and a current amplifier 37, which loop feeds the voltage applied at the terminal 341 of the diode 34 back to the input. The differential amplifier has a first input 361 connected to the terminal 32 and a second input 362 connected to the output of the loop, i.e., to the output of the amplifier 37. The output signal is collected between terminals 38, 39 which are connected to that of the diode directly or through a matching circuit 310 which may be a filtering capacity, as in the circuit of FIG. 1, or an amplifying and integrating device, according to the final use of the output signal.

The operation of the device may be explained by means of the characteristic of the tunnel diode shown in FIG. 2. It should be noted (a) that, the loop tends to maintain the voltage applied to the diode equal to the input voltage E and (b) that the current amplifier 37 keeps constant the current flowing through the diode so long as a constant voltage is applied to the amplifier 37. Under these conditions as long as the input voltage rises, while remaining below the voltage $V_p$, the voltage at 341 remains equal to E (with an accuracy which depends on the gain of the loop 35). As soon as E reaches $V_p$ and exceeds the same, that is when $E=V_p+\epsilon$, the voltage at the diode terminals is no longer equal to E and the operation point jumps suddenly from $P_0$ to $P''$.

As may be readily seen from FIG. 2, the voltage at the diode terminals undergoes then a variation equal to $V''-V_p$ since the diode is the element in the circuit having the quickest response (i.e., the shortest response delay). This unbalances the loop 35 and voltage at 341 becomes again equal to $V_p+\epsilon$ and the cycle continues. The detection signal collected from the terminals of the diode is a sequence of relaxation oscillations whose characteristics depend on those of the loop.

If E continues to rise, the oscillations cease when E reaches the valley voltage $V_v$, from where the characteristic of the diode forms an ascending curve. On the other hand, if E varies about $V_p$ one is always near the peak of the characteristic and therefore at the same threshold.

The oscillations can be amplified or integrated in a device 310 formed for example, by a capacitance preceded by a backward diode.

Figure 4:
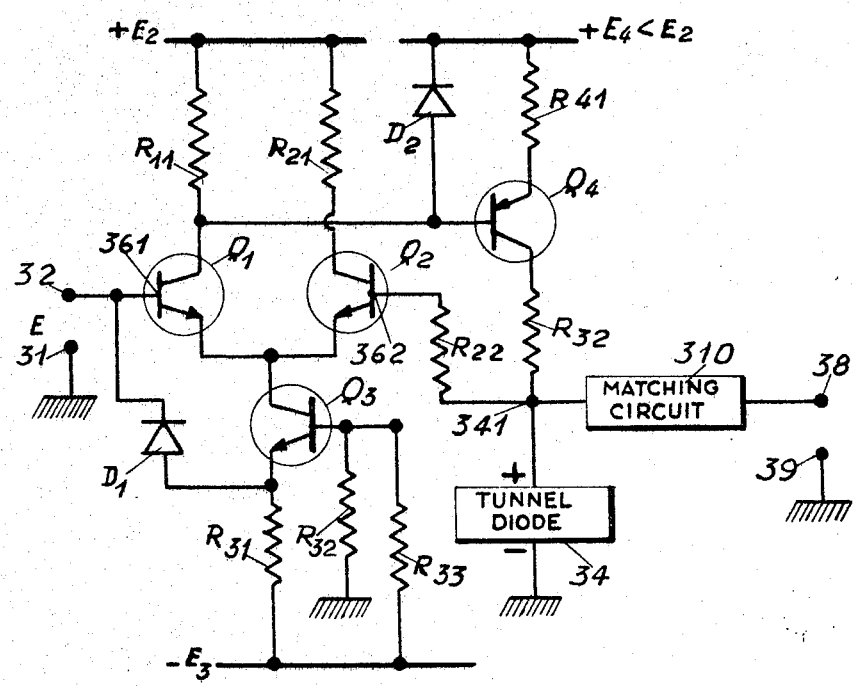
FIG. 4 is a preferred embodiment of the level detector according to the invention.

In the threshold detector circuit shown in FIG. 4, the differential amplifier 36 of FIG. 3 is formed by two transistors $Q_1$ and $Q_2$ and of a transistor $Q_3$. Current amplifier 37 is built up by a transistor $Q_4$. More particularly, the input terminal 32 is connected to the base of the n-p-n transistor $Q_1$. The collector of the latter and that of the transistor $Q_2$ are connected to a positive voltage source $+E_2$ through equal resistors $R_{11}$ and $R_{21}$. Their emitters are connected to the collector of the n-p-n transistor $Q_3$. A negative voltage source $-E_3$ ensures the base-emitter bias of the transistor $Q_3$. To this end, three resistors $R_{31}$, $R_{32}$ and $R_{33}$ are connected between the emitter of $Q_3$ and the bias source, between the base and the ground and between the base and the source. The current $I_{c3}$ on the collector of transistor $Q_3$ is independent of the collector voltage if the base current is negligible relative to the currents in the resistors $R_{31}$ and $R_{33}$. The values of the three resistors $R_{31}$, $R_{32}$, $R_{33}$ and of $E_3$ are so selected that this condition is realised. The sum of the currents of the transistors $Q_1$ and $Q_2$, equal to $I_{c3}$, is then constant and any rise of the current in one results in an equivalent reduction in the other.

The output voltage of amplifier 361 is taken from the collector of $Q_1$ and applied to the base of the p-n-p transistor $Q_4$, whose emitter is connected to a constant voltage source $E_4$, lower than $E_2$ through a resistor $R_4$.

The collector of transistor $Q_4$ is connected to the first terminal of a resistor $R_4$, whose other terminal is connected at the common point 341 to the tunnel diode 34 and to the base of the transistor $Q_2$ which forms the second input 362 of the diagram of FIG. 3.

It will now be shown that the voltage at the point 341 varies in fact with the input voltage E:

Resistors $R_{11}$ and $R_{21}$ and $I_{c3}$ are so chosen that in the absence of any input voltage ($E=0$) the collector voltages of transistors $Q_1$ and $Q_2$, $V_{c1}$ and $V_{c2}$, then equal, are at least equal to $E_4$ (which explains why $E_4$ was selected smaller than $E_2$). Under these conditions the transistor $Q_4$ is blocked and no voltage appears at 341.

When E rises from zero the transistor $Q_1$ becomes more conducting and voltage $C_{c1}$ drops (and as a consequence, voltage $V_{c2}$ rises since it has been shown that the sum of the currents in the transistors $Q_1$ and $Q_2$ is constant). The voltage variation $\Delta V_{c1}$ at the terminals of resistor $R_{11}$, is the difference of the voltages applied at 361 and 362 and amplified by the differential amplifier 361.

When the voltage applied to the base of the transistor $Q_4$ drops below $E_4$, transistor $Q_4$ becomes conducting. A voltage appears at 341. This voltage is fed back to the input 362 of the loop and maintained thereby equal to the input voltage at 361. If V is the voltage at 362 it follows that $E \simeq V$ with an error of $$\frac{V-E}{E}=1/G$$

where G is the gain of the open loop.

The potential at the output terminals 38, 39 varies as a function of the potential at 341 as in the diagram in FIG. 3.

The theoretical operation described assumes that $Q_4$ becomes conducting when $V_{c1}$ differs from zero. This supposes that $V_{c01}$, the value of $V_{c1}$ for $E=0$, is equal to $E_4$. However, since it is necessary that $V_{c01}$ should not be lower than $E_4$, one must take practically $V_{c01}=E_4+\epsilon'$ where $\epsilon'$ is larger than 0 and small compared with $E_4$. It follows that the comparator threshold is equal to $$S=V_{\mathrm{D}}+\frac{\epsilon'+\Delta V_{\mathrm{be4}}}{A}$$

where A is the differential amplifier voltage gain, and $\Delta V_{\mathrm{be4}}$ is the voltage necessary for the conductivity of $Q_4$.

The resistor $R_{42}$ placed in the collector circuit of the transistor $Q_4$ is aimed at defining the maximum current value therein, $2I_p$; the diodes $D_1$ and $D_2$ protect the base emitter junctions of the transistors $Q_1$ and $Q_4$ against reverse voltages and the resistor $R_{22}$ in the base circuit of the transistor $Q_2$ protects the tunnel diode against excessive current which may be due to the parasitic base-emitter capacitance of the transistor $Q_2$.

A circuit realized with elements having the following values has a threshold stability of $\pm 10$ mv. between $-40°$ and $+100°$ C.

Threshold value: +70 mv.
$E_2=+50$ v.
$E_4=+30$ v.
$Q_1$ and $Q_2$ paired n-p-n—2N2223
$Q_4$=p-n-p—2N1132
$Q_3$ is n-p-n 2N1613
$R_1$ and $R_{21}$=9.1 kilohms 2%
$R_{22}$=220 ohms 2%
$R_4$=2.2 kilohms 2%
$R_{31}$=3.9 kilohms 2%
$R_{32}=R_{33}$=15 kilohms 2%
$D_1=D_2-F_D$ 100
34: IN2930 (Si tunnel diode)
310: HU25A (Backward Si diode)

Of course, the invention is not limited to the embodiment described. In particular, the circuit of FIG. 4 can be realized with other transistors provided that care is taken to connect the elements correctly.

An circuit according to the invention, has the advantages that:

(a) The threshold is independent of the temperature;
(b) The threshold is independent of the speed of variation of the input voltage

What is claimed is:

1. A voltage level detector comprising:
   a signal input;
   a tunnel diode having terminals;
   a negative feedback loop coupling continuously said diode to said signal input, said loop comprising a differential amplifier having a first input coupled to said signal input, a second input, and an output, and a current amplifier having an input coupled to said output and an output coupled to said diode and to said second input; and means for collecting an output signal at said terminals.

2. A voltage level detector as claimed in claim 1, wherein said differential amplifier comprises a first and a second similar transistor having a common emitter coupling, and their respective bases coupled respectively to said signal input and to said current amplifier output and wherein said current amplifier is a transistor having a base coupled to the collector of one of said first and second transistors an dits colector coupled to said diode and to the base of said second emitter.

References Cited

UNITED STATES PATENTS

| 3,176,152 | 3/1965 | Spiegel. |
| 3,281,608 | 10/1966 | Doyle. |
| 3,287,653 | 11/1966 | Goordman. |
| 3,321,576 | 5/1967 | Linder et al. |
| 3,327,139 | 6/1967 | Hillman. |

ARTHUR GAUSS, *Primary Examiner.*

B. P. DAVIS, *Assistant Examiner.*

U.S. Cl. X.R.

307—235